(12) United States Patent
Wang (10) Patent No.: US 12,120,419 B2
(45) Date of Patent: Oct. 15, 2024

(54) IMAGE PROCESSING METHOD, TERMINAL AND STORAGE MEDIUM

(71) Applicant: Beijing Xiaomi Mobile Software Co., Ltd., Beijing (CN)

(72) Inventor: Yue Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 18/075,846

(22) Filed: Dec. 6, 2022

(65) Prior Publication Data

US 2024/0056674 A1    Feb. 15, 2024

(30) Foreign Application Priority Data

Aug. 11, 2022 (CN) .......................... 202210963286.8

(51) Int. Cl.
*H04N 23/63* (2023.01)
*H04N 23/53* (2023.01)

(52) U.S. Cl.
CPC .......... *H04N 23/632* (2023.01); *H04N 23/53* (2023.01)

(58) Field of Classification Search
CPC ........... H04N 5/23216; H04N 5/23293; H04N 5/23245; H04N 5/2628; H04N 5/225; H04N 5/232
See application file for complete search history.

(56) References Cited

U.S. PATENT DOCUMENTS

| | | |
|---|---|---|
| 2008/0055446 A1 | 3/2008 | Hunter et al. |
| 2020/0053283 A1* | 2/2020 | Li ......................... H04N 23/667 |
| 2021/0344785 A1 | 11/2021 | Huang et al. |
| 2022/0272246 A1* | 8/2022 | Verma .................... H04N 23/72 |
| 2022/0303476 A1* | 9/2022 | Jang ....................... H04N 23/51 |

* cited by examiner

*Primary Examiner* — Xi Wang
(74) *Attorney, Agent, or Firm* — Volpe Koenig (57) ABSTRACT

An image processing method that may be applied to a selfie preview scenario. In some examples, a selfie preview image is generated when a user takes a selfie through a terminal, so as to facilitate the user to preview through the selfie preview image, for example, the terminal may be a terminal with foldable screen.

18 Claims, 7 Drawing Sheets

IMAGE PROCESSING METHOD, TERMINAL AND STORAGE MEDIUM

CROSS REFERENCE TO RELATED APPLICATIONS

The disclosure is based on and claims priority to Chinese Patent Application No. 202210963286.8, filed on Aug. 11, 2022, the entire contents of which are incorporated herein by reference.

BACKGROUND

When a user takes a selfie using a terminal, according to use habits of the user, a selfie preview image is a mirror image of a target object.

SUMMARY

According to a first aspect of examples of the present disclosure, an image processing method is provided, the method is performed by a terminal with a foldable screen, in an unfolded state, the terminal includes a first surface, the first surface includes a first display and an image acquisition apparatus, the image acquisition device includes an image sensor, and the method includes:

acquiring an object image of a target object by using the image acquisition apparatus in an unfolded state of the terminal in response to receiving a selfie preview operation triggered by a user;

obtaining a mirror image of the target object by reading the object image from the image sensor; and generating a selfie preview image according to the mirror image, and displaying the selfie preview image on the first display.

According to a second aspect of examples of the present disclosure, a terminal with foldable screen is provided, in an unfolded state, the terminal includes a first surface, the first surface includes a first display and an image acquisition apparatus, the image acquisition apparatus includes an image sensor; the terminal includes:

a memory, on which a computer program is stored; and a processor, used to execute the computer program in the memory, so as to implement steps of the method in any one of the examples in the first aspect.

According to a third aspect of examples of the present disclosure, there is provided a non-transitory computer-readable storage medium on which a computer program is stored, and steps of the method in the first aspect are implemented when the program is executed by the processor.

It shall be understood that the above general description and the following detailed description are only exemplary and explanatory, and cannot limit the present disclosure.

Other characteristics and advantages of the present disclosure are described in detail in the subsequent specific embodiments.

BRIEF DESCRIPTION OF DRAWINGS

The accompanying figures herein are incorporated into the specification and constitute a part of the specification, show examples consistent with the present disclosure, are used to explain the principle of the present disclosure together with the specification, but do not limit the present disclosure.

DETAILED DESCRIPTION

Examples will be described in detail here, and examples thereof are shown in the accompanying drawings. When the following descriptions refer to the drawings, the same numbers in different drawings indicate the same or similar elements, unless otherwise indicated. The implementations described in the following examples do not represent all implementations consistent with the present disclosure. Instead, they are merely examples of apparatuses and methods consistent with some aspects of the present disclosure described as detailed in the appended claims. It should be understood that the specific implementations described herein are intended only to illustrate and explain the present disclosure and are not intended to limit the present disclosure.

It should be noted that all actions for acquiring signals, information or data in the application are carried out on the premise of complying with the corresponding data protection regulations and policies of the country where the application is located, and with the authorization of the corresponding apparatus owner.

The disclosure relates to the field of terminals, and in particular to an image processing method, a terminal, and a storage medium.

In the related art, generally, the selfie preview image is obtained by performing mirror processing on acquired images at the operating system of the terminal, however, mirror processing on images on the operating system level is complex to achieve, the software maintainability is poor, power consumption of the terminal is increased, and the experience of the user is affected.

First, the application scenario of the present disclosure is explained, and the present disclosure may be applied to a selfie preview scenario, in which a selfie preview image is generated when a user takes a selfie through a terminal, so as to facilitate the user to preview through the selfie preview image, for example, the terminal may be a terminal with foldable screen, and in practical application, the terminal can be a cellphone, a tablet, a smart watch, a smart bracelet, a Personal Digital Assistant (PDA), and Customer Premise Equipment (CPE), which is not limited herein.

Figure 1:
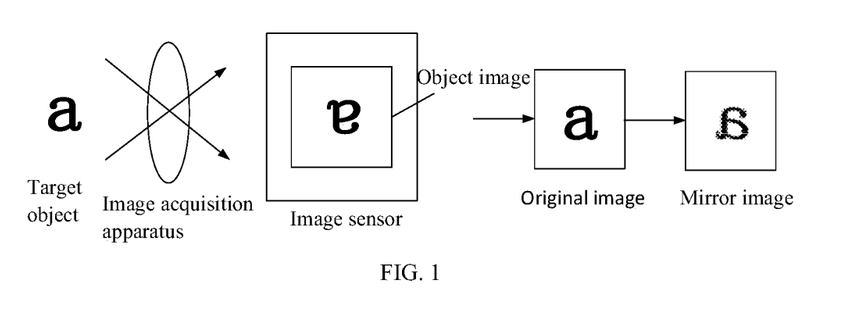
FIG. 1 is a schematic diagram of selfie preview image processing in the related art.

FIG. 1 is a schematic diagram of selfie preview image processing in the related art, as shown in FIG. 1, a target object as "a" is taken as an example to explain that an object image is generated on an image sensor by using an image acquisition apparatus (such as a camera) in response to receiving a selfie preview operation triggered by a user, FIG. 1 shows that "n" in the object image is equivalent to turning "a" in horizontal and vertical directions, after the object image is generated on the image sensor, an original image is obtained by reading the object image from the image sensor by using a camera module of the terminal after the object image is generated on the image sensor, for example, the camera module can read corresponding pixel information in the object image in a preset sequence from a plurality of pins (PIN) of the image sensor (for example, reading a row of pixel information from right to left, and then reading a plurality rows of pixel information from top to bottom), the original image of the target object is obtained according to the pixel information (for example, writing a row of pixel information from left to right, and then writing a plurality rows of pixel information from bottom to top), and "a" in the original image is consistent with the target object.

After obtaining the original image, the original image is cached, and the selfie preview image is obtained by performing mirror processing on the original image on the operating system level of the terminal. The target object is displayed as "ƀ" in the selfie preview image.

However, the inventor notices that the related art has the following problems: in one aspect, the selfie preview image can be obtained by performing mirror processing on the original image again on the operating system level, which is complex to implement; and performing mirror processing on the original image again on the operating system level affects the maintainability of software, performing mirror processing on the original image again further affects the performance of the terminal, increases the power consumption of the terminal, and affects the experience of a user. In another aspect, in the case where mirror processing is performed on the original image, the original image needs to be cached, resulting in large cache resource consumption and affecting terminal performance.

According to an image processing method provided in the present disclosure, an mirror image of a target object is directly obtained to generate a selfie preview image, without performing mirror processing on the operating system level of a terminal, so that resource consumption of the terminal is reduced, the performance and maintainability of software are improved, power consumption of the terminal is reduced, and the experience of a user is improved.

The disclosure is described in detail below in combination with the specific examples.

Figure 2:
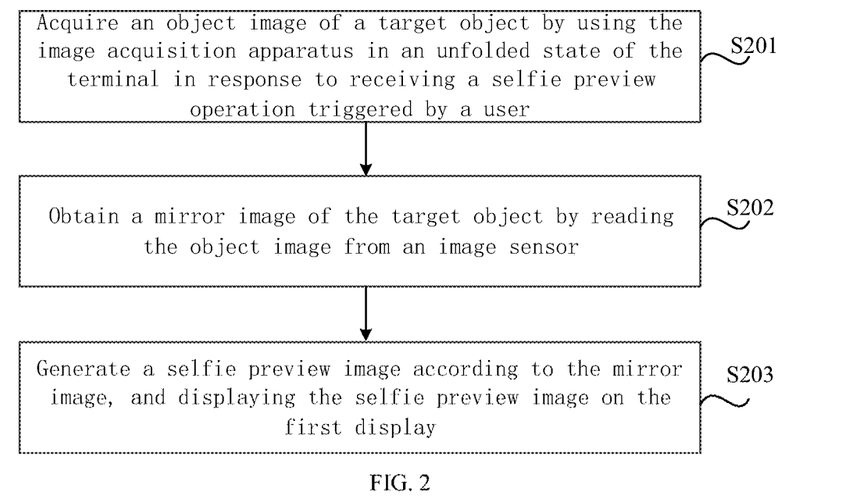
FIG. 2 is a flowchart of an image processing method according to an example.

FIG. 2 is a flowchart of an image processing method according to an example. As shown in FIG. 2, the method may include the following steps:

In step S201, acquiring an object image of a target object by using an image acquisition apparatus in an unfolded state of a terminal with a foldable screen in response to receiving a selfie preview operation triggered by a user.

The terminal includes a first surface and a second surface opposite to the first surface, the first surface includes a first display and an image acquisition apparatus, the image acquisition apparatus includes an image sensor, in the unfolded state, the terminal also includes the second surface opposite to the first surface, and the second surface has a second display. For the terminal, the second display is a relatively large screen, and the first display is a relatively small screen; and in the unfolded state, the lighting surface of the first display is opposite to the lighting direction of the first display, the first surface and the second surface have a middle line (i.e., a folding line of the terminal) in the same position, the first display is on one side of the middle line, and the image acquisition apparatus is on the other side of the middle line.

When the terminal is in a folded state, screens on both sides of the middle line of the second display are oppositely turned along the position of the middle line of the second display, so as to fold the second display inside the folded terminal; and at the moment, the first display is positioned outside the terminal, a user can operate the terminal through the first display, for example, the image acquisition apparatus can be controlled through the first display to take images.

Figure 3:
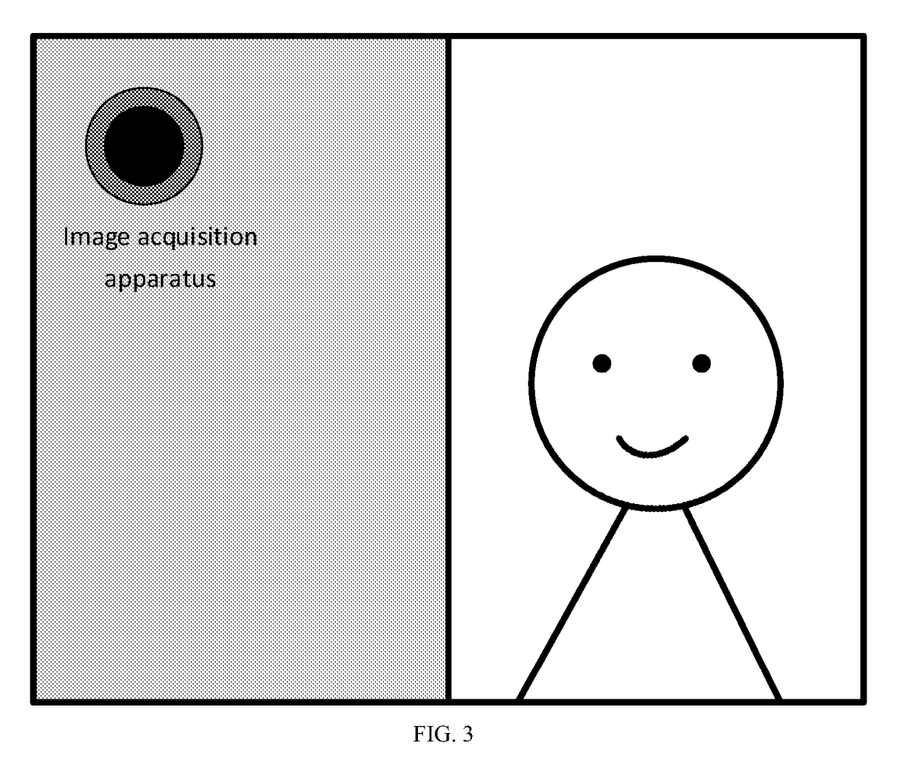
FIG. 3 is a schematic diagram of a selfie of a flexible display according to an example.

FIG. 3 is a schematic diagram of a selfie of a flexible display according to an example. As shown in FIG. 3, in an unfolded state the terminal, the first surface of the terminal faces the user, the first surface may include the image acquisition apparatus and the first display. Accordingly, the second surface is at the back of the first surface, in this scenario, the image acquisition apparatus may be used to acquire the object image of the target object, and the selfie preview image may be displayed on the first display.

By adopting the selfie solution, the object image of the target object may be acquired by using the image acquisition apparatus of the flexible display, and the object image of the target object is acquired by using a high-performance image acquisition apparatus, so that the quality of the object image may be improved, and the experience of the user can be improved.

In some examples, the image acquisition apparatus may include a plurality of image acquisition components, the plurality of image acquisition components may have the same or different properties and specifications. For example, the plurality of image acquisition components may be a plurality of cameras with the same or different properties and specifications, and the object image of the target object can be acquired by using one or more image acquisition components of the plurality of image acquisition components.

By adopting the selfie solution, the object image of the target object can be acquired by using one or more image acquisition components of the plurality of image acquisition components, so that the quality of the object target can be further improved, or the effect of obtaining differentiated object images can be achieved, and the experience of the user can be further improved.

In some examples, the object image of the target object can be acquired by using the image acquisition apparatus through the following steps in response to receiving the selfie preview operation triggered by the user.

In step 1, an image acquisition picture acquired by using the image acquisition apparatus is displayed on the second display in response to receiving the first operation.

The first operation may include turning on the image acquisition function of the terminal. For example, an image acquisition application on the terminal is turned on.

In some possible implementations, a second image acquisition apparatus may be further set on the second surface of the terminal, and the performance of the image acquisition apparatus on the first surface is prior to that of the second image acquisition apparatus.

Turning on the image acquisition function of the terminal may be performed on the second display of the terminal, after turning on the image acquisition function of the terminal, the image acquisition picture acquired by the image acquisition apparatus can be displayed on the second display. At the moment, since the second image acquisition apparatus is not set on the second surface of the second display, or the image quality of the second image acquisition apparatus cannot meet user demands, the object image of the target image can be acquired by using the image acquisition apparatus in response to the second operation of the user.

In step 2, the object image of the target object is acquired by using the image acquisition apparatus in response to receiving the second operation.

The second operation may include turning on a rear selfie mode of the terminal. For example, the rear selfie mode is to acquire the object image of the target object by using the image acquisition apparatus. Specifically, the rear selfie mode of the terminal is turned on in response to the second operation of the user performed in the interface of the image acquisition picture on the second display, at the moment, in the unfolded state of the terminal, both the image acquisition apparatus in the first surface and the first display face to the user, and the object image of the target object is acquired by using the image acquisition apparatus.

In step S202, the mirror image of the target object is obtained by reading the object image from the image sensor.

Figure 4:
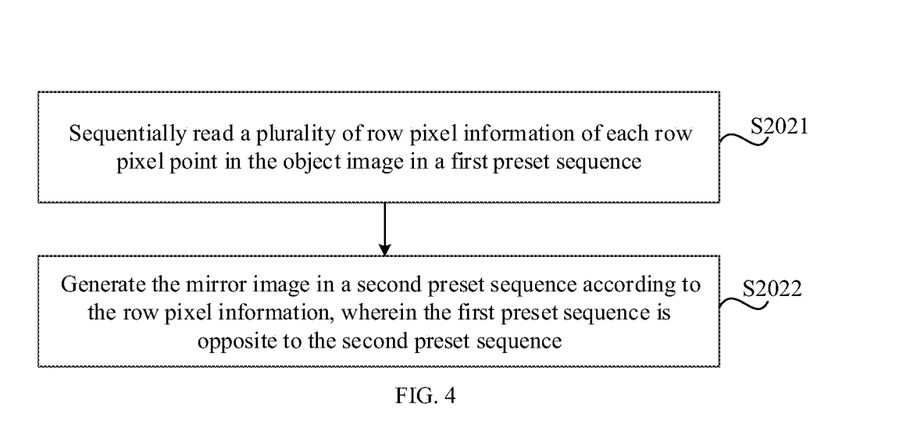
FIG. 4 is a flowchart of another image processing method according to an example.

FIG. 4 is a flowchart of another image processing method according to an example, and as shown in FIG. 4, step S202 may include the following steps:

in step S2021, sequentially reading a plurality of row pixel information of each row pixel point in the object image in a first preset sequence.

For example, according to different specifications of camera sensors, object images of target objects generated on the camera sensors are different in the number of pixels. For example, the object images may include a total of M rows and N columns of M*N pixel points. In some possible implementations, a plurality of row pixel information of each row pixel point in the object image may be read in the first preset sequence. For example, the row pixel information may be read in an increasing sequence from 1 to M.

In step S2022, the mirror image is generated in a second preset sequence according to the row pixel information.

The first preset sequence is opposite to the second preset sequence.

In some possible implementations, the row pixel information may be read in an increasing sequence from 1 to M, the row pixel information is sequentially written into corresponding rows of the mirror image in a decreasing sequence from M to 1, so as to generate the mirror image.

Figure 5:
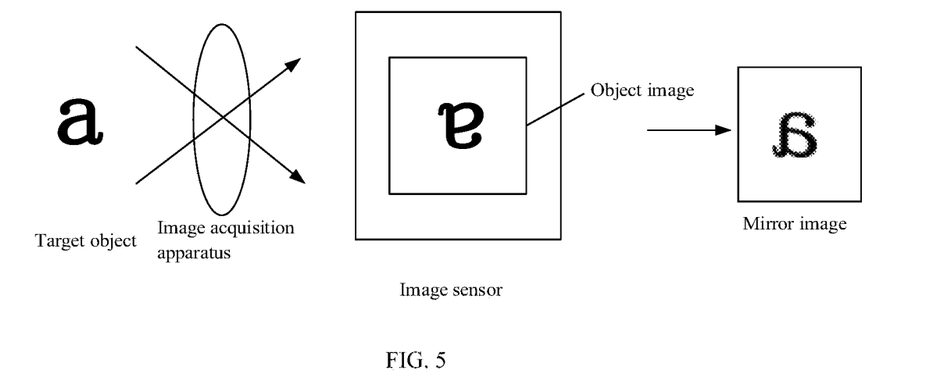
FIG. 5 is a schematic diagram of selfie preview image processing according to an example.

FIG. 5 is a schematic diagram of selfie preview image processing according to an example. As shown in FIG. 5, the target as "a" is still taken as an example to explain that a camera module can read corresponding pixel information in the object image from a plurality of pins (PIN) of an image sensor in a preset sequence (for example, reading a plurality rows of pixel information from top to bottom), the mirror image of the target object is obtained according to these pixel information (for example, writing a plurality rows of pixel information from bottom to top), and the target is displayed as "ƨ" in the mirror image. In the related art, mirror processing needs to be performed on the original image on the operating system level, so as to obtain a selfie preview image (i.e., a mirror image) of the target image. Compared with technical solutions of the related art illustrated in FIG. 1, only the sequences in which the camera module reads and writes the mirror image from the image sensor need to be adjusted, there is no need to occupy a large number of caches, and there is no need to perform mirror processing again on the operating system level.

In step S203, a selfie preview image is generated according to the mirror image, and the selfie preview image is displayed on the first display. In some examples, the step may include two possible implementations, where in one implementation, the mirror image may be taken as the selfie preview image, and in another implementation, the selfie preview image is obtained by performing first image enhancing processing on the mirror image.

In this way, the image quality of the generated selfie preview image can be improved by performing image enhancement on the mirror image, and thus the user experience is improved.

In some examples, the first image enhancing processing may include at least one of an Image Front-end Engine (IFE), an Image Processing Engine (IPE), an anti-shake algorithm, a makeup algorithm, cultural black and white, portrait helical focus, and portrait soft focus. Each processing method is applicable to different scenarios according to user demands and characteristics of different processing methods; portrait soft focus has the characteristic of a soft focus effect and highlight brightening, and is generally applicable to a scenario with sufficient ambient lighting; portrait helical focus has the characteristic of a camera lens aperture erosion effect, and is generally applicable to a scenario of night with rich light spots; and cultural black and white has the characteristic of more precise detail description, but is applicable to a non-human scenario (such as flowers and trees) due to the lack of color information. Specifically, the present disclosure does not limit technical solutions for image enhancing processing.

After the selfie preview image is generated, the selfie preview image may be displayed on the first display to facilitate the user to preview the selfie image effect. In some possible implementations, the selfie preview image can be displayed on a part or the whole of the first display of the terminal, and in another possible implementation, in the case where the selfie preview image is displayed on the first display, the selfie preview image of the second display may be turned off.

By adopting the solution, the mirror image of the target object is directly obtained to generate the selfie preview image without performing mirror processing on the operating system level of a terminal, so that resource consumption of the terminal is reduced, the performance and maintainability of software are improved, power consumption of the terminal is reduced, and the experience of the user is improved.

In some examples, the method may further include: generating a target image corresponding to the target object according to the mirror image in response to receiving an image generation operation triggered by the user.

The image generation operation may be a shooting operation. For example, the user can take a selfie by triggering a shooting button on the terminal to generate the target image and store the target image. The image generation operation may further be a video operation. For example, the user can take a video by long-pressing the shooting button on the terminal to generate and store the target image in real time.

In a possible implementation, generating the target image corresponding to the target object according to the mirror image may include the following steps:

Step 1: acquiring mirror indication information preset by the user.

The mirror indication information is used to indicate whether to turn on mirror processing or turn off mirror processing.

In some possible implementations, the terminal may display mirror image setting options, and the user may set whether to turn on mirror processing through the displayed mirror image setting options to generate mirror indication information, in the case where the mirror indication information is used to indicate to turn on mirror processing, it is represented that the mirror image of the target object needs to be used as the target image of the target object, and in the case where the mirror indication information is used to indicate to turn off mirror processing, it is represented that the original image of the target object is used as the target image of the target object.

In step 2, the target image is generated according to the mirror indication information and the mirror image.

In some examples, the target image is generated according to the mirror image when the mirror indication information is used to indicate to turn on mirror processing.

The target image may be directly generated according to the mirror image because the mirror image of the target object has been obtained. Compared with technical solutions of the related art, a Graphics Processing Unit (GPU) is not needed to perform mirror processing on the original image again, so that the software performance is improved, the power consumption of the terminal is reduced, and the experience of the user is further improved.

In another example, the target image is obtained by performing second image enhancing processing on the mirror image.

In the case where the target generation operation includes a shooting operation, the second image enhancing processing may include at least one of a Bayer Processing Segment (BPS), an Image Processing Engine (IPE), an anti-shake algorithm, a multi-frame noise reduction algorithm, a makeup algorithm, cultural black and white, portrait helical focus, and portrait soft focus.

In the case where the target generation operation includes a video operation, the second image enhancing processing may include at least one of an Image Front-end Engine (IFE), an Image Processing Engine (WE), an anti-shake algorithm, a makeup algorithm, cultural black and white, portrait helical focus, and portrait soft focus.

The present disclosure does not limit technical solutions for image enhancing processing.

In other examples, the target image is obtained by performing mirror processing on the mirror image in the case where the mirror indication information is used to indicate to turn off mirror processing.

In some possible implementations, the target image is obtained by performing mirror processing on the mirror image through the following steps.

In step 1, a plurality of column pixel information of each column pixel point in the mirror image is sequentially read in a third preset sequence.

For example, according to different specifications of camera sensors, object images of target objects generated on the camera sensors are different in the number of pixels. For example, the object images may include a total of M rows and N columns of M*N pixel points. In some possible implementations, a plurality of column pixel information of each column pixel point in the object image may be read in the third preset sequence. For example, the column pixel information may be read in an increasing sequence from 1 to N.

Step 2, the target image is generated in a fourth preset sequence according to the column pixel information.

The third preset sequence is opposite to the fourth preset sequence.

In some possible implementations, the column pixel information may be read in an increasing sequence from 1 to N, the row pixel information is sequentially written into corresponding columns of the target image in a decreasing sequence from N to 1, so as to generate the mirror image.

For example, performing mirror processing on the mirror image to obtain the target image may be processed by means of the GPU of the terminal. When the user takes a selfie, the probability that the mirror indication information indicates to turn on mirror processing is much greater than the probability that the mirror indication information indicates to turn off mirror processing, and compared with technical solutions of the related art (mirror processing is performed on the original image in the case where the mirror indication information indicates to turn on mirror processing), the processing workload of mirror processing of the GPU may be greatly reduced, and resource consumption of the GPU may be reduced.

In other examples, second image enhancing processing may also be performed on the mirror image before the target image is generated according to the mirror indication information and the mirror image, and after the second image enhancing processing on the mirror image, the target image is generated according to the mirror image and the mirror indication information after second image enhancing processing.

By adopting the solution, the mirror image of the target object is directly obtained to generate the target image, so that mirror processing in the generated target image is reduced, resource consumption of the terminal is further reduced, the software performance is improved, power consumption of the terminal is reduced, and the experience of the user is improved.

Figure 6:
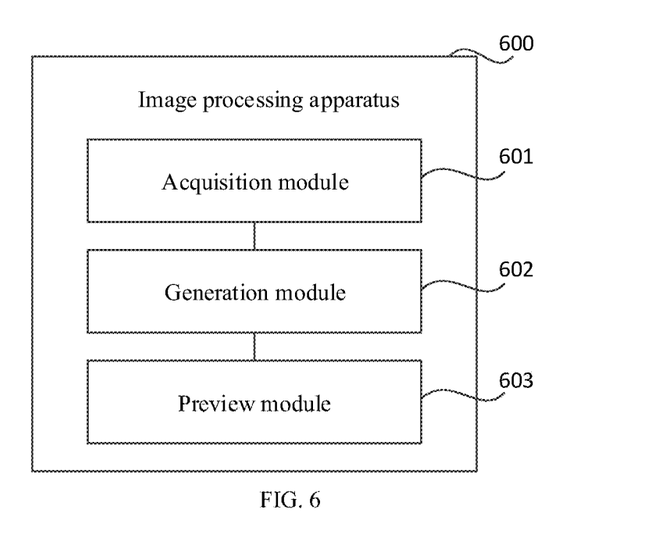
FIG. 6 is a block diagram of an image processing apparatus according to an example.

FIG. 6 is a block diagram of an image processing apparatus according to an example. As shown in FIG. 6, the image processing apparatus 600 is applied to a terminal with a foldable screen, and in an unfolded state, the terminal includes a first surface, where the first surface includes a first display and an image acquisition apparatus, and the image acquisition apparatus includes an image sensor; and the image processing apparatus 600 includes:

an acquisition module 601, configured to acquire an object image of a target object by using the image acquisition apparatus in the unfolded state of the terminal in response to receiving a selfie preview operation triggered by a user;

a generation module 602, configured to obtain a mirror image of the target object by reading the object image from the image sensor; and a preview module 603, configured to generate a selfie preview image according to the mirror image, and display the selfie preview image on the first display.

In some examples, in the unfolded state of the terminal, the terminal further includes a second surface opposite to the first surface, and the second surface has a second display; the selfie preview operation includes a first operation and a second operation triggered on the second display; the acquisition module 601 is further configured to:

display an image acquisition picture acquired by using the image acquisition apparatus on the second display in response to receiving the first operation; and acquire the object image of the target object by using the image acquisition apparatus in response to receiving the second operation.

In some examples, the preview module 603 is further configured to:

turn off the selfie preview image on the second display when displaying the selfie preview image on the first display.

In some examples, the generation module 602 is further configured to:

sequentially read a plurality of row pixel information of each row pixel point in the object image in a first preset sequence; and generate the mirror image in a second preset sequence according to the row pixel information, where the first preset sequence is opposite to the second preset sequence.

In some examples, the image acquisition apparatus includes a plurality of image acquisition components, and the acquisition module 601 is further configured to:

acquire the object image of the target object by using one or more image acquisition components of the plurality of image acquisition components.

In some examples, the preview module 603 is further configured to:

use the mirror image as the selfie preview image; or obtain the selfie preview image by performing first image enhancing processing on the mirror image.

With regard to the apparatus in the above examples, the specific manners in which various modules perform operations have been described in detail in the examples relating to the methods, and details are not described herein.

By adopting the solution, the mirror image of the target object is directly obtained to generate the selfie preview image without performing mirror processing on the operating system level of a terminal, so that resource consumption of the terminal is reduced, the performance and maintainability of software are improved, power consumption of the terminal is reduced, and the experience of the user is improved.

Figure 7:
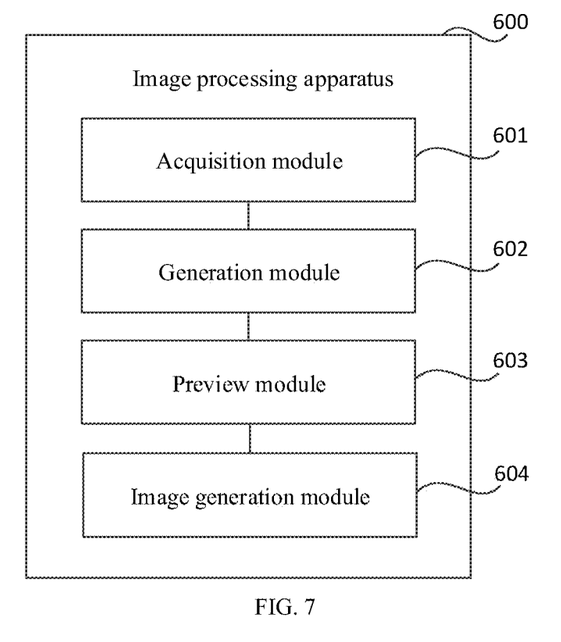
FIG. 7 is a block diagram of another image processing apparatus according to an example.

FIG. 7 is a block diagram of an image processing apparatus according to an example. As shown in FIG. 7, the image processing apparatus 600 further includes:

an image generation module 604, configured to generate the target image corresponding to the target object according to the mirror image in response to receiving an image generation operation triggered by the user.

In some examples, the image generation module 604 is further configured to:

acquire mirror indication information preset by the user, where the mirror indication information is used to indicate whether to turn on mirror processing or turn off mirror processing; and generate the target image according to the mirror indication information and the mirror image.

In some examples, the image generation module 604 is further configured to:

generate the target image according to the mirror image in the case where the mirror indication information is used to indicate to turn on mirror processing; or obtain the target image by performing mirror processing on the mirror image in the case where the mirror indication information is used to indicate to turn off mirror processing.

In some examples, the image generation module 604 is further configured to:

sequentially read a plurality of column pixel information of each column pixel point in the mirror image in a third preset sequence; and generate the target image in a fourth preset sequence according to the column pixel information, the third preset sequence is opposite to the fourth preset sequence.

In some examples, the image generation module 604 is further configured to:

use the mirror image as the target image; or obtain the target image by performing second image enhancing processing on the mirror image.

With regard to the apparatus in the above examples, the specific manners in which various modules perform operations have been described in detail in the examples relating to the methods, and details are not described herein.

By adopting the solution, the mirror image of the target object is directly obtained to generate the target image, so that mirror processing in the generated target image is reduced, resource consumption of the terminal is further reduced, the software performance is improved, power consumption of the terminal is reduced, and the experience of the user is improved.

Figure 8:
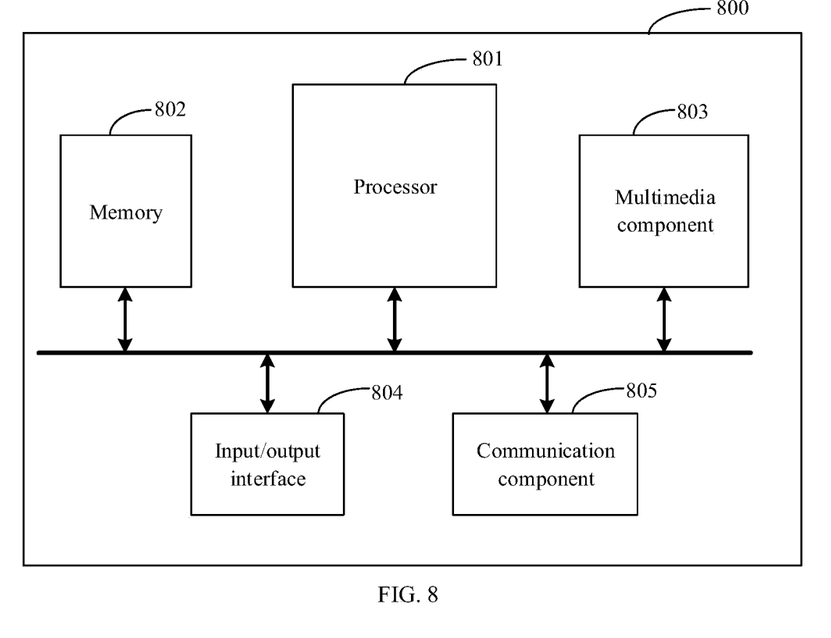
FIG. 8 is a block diagram of a terminal according to an example.

FIG. 8 is a block diagram of a terminal 800 according to an example. As shown in FIG. 8, the terminal 800 may include: a processor 801, and a memory 802. The terminal 800 may further include one or more of a multimedia component 803, an input/output interface 804, and a communication component 805.

In some examples, the terminal includes a foldable screen, in an unfolded state, the terminal includes a first surface, the first surface includes a first display and an image acquisition apparatus, and the image acquisition apparatus includes an image sensor.

The processor 801 is used to control the overall operations of the terminal 800, to complete all or part of steps of the image processing method. The memory 802 is used to store various types of data to support operations on the terminal 800. These data may include, for example, instructions for any application or method to operate on the terminal 800, as well as application-related data, such as contact data, messages sent and received, figures, audio and videos. The memory 802 may be implemented by any type of volatile or non-volatile storage device or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk or optical disk. The multimedia component 803 may include a screen and an audio component. The screen may be, for example, a touch screen, and the audio component is used to output and/or input audio signals. For example, the audio component may include a microphone, and the microphone is used to receive external audio signals. The received audio signals may be further stored in the memory 802 or sent through the communication component 805. The audio component also includes at least one speaker, used to output audio signals. The input/output interface 804 provides an interface between the processor 801 and other interface modules. The other interface modules may be a keyboard, a mouse, a button, and the like. These buttons may be virtual buttons or entity buttons. The communication component 805 is used for wired or wireless communication between the terminal 800 and other devices. Wireless communication, such as Wi-Fi, Bluetooth, Near Field Communication (NFC), 2G, 3G, 4G, NB-IOT, eMTC, or other 5G, etc., or a combination of one or more of them, which is not limited here. Therefore, the corresponding communication component 805 may include: a Wi-Fi module, a Bluetooth module, an NFC module, and the like.

In another example, the disclosure further provides a non-transitory computer-readable storage medium including program instructions, where when program instructions are executed by a processor, steps of the image processing method are implemented. For example, the computer-readable storage medium may be the memory 802 including program instructions which may be executed by the processor 801 of the terminal 800 to complete the image processing method.

It would be easy for those skilled in the art to conceive of another example of the present disclosure upon consideration of the specification and practice of the present disclosure. This application is intended to cover any variation, use, or adaptation of the disclosure, and these variations, uses, or adaptations follow the general principles of the disclosure and include common general knowledge or customary technical means in the art that are not disclosed in the disclosure. The specification and the examples are merely regarded as exemplary, and the real scope and spirit of the disclosure are indicated by the following claims.

It should be understood that the disclosure is not limited to the precise structure described above and shown in the drawings, and various modifications and changes can be made without departing from the scope of the present disclosure. The scope of the present disclosure is only limited by the appended claims.

According to a first aspect of examples of the present disclosure, an image processing method is provided, the method is performed by a terminal with foldable screen, in an unfolded state, the terminal includes a first surface, the first surface includes a first display and an image acquisition apparatus, the image acquisition device includes an image sensor, and the method includes:
  acquiring an object image of a target object by using the image acquisition apparatus in an unfolded state of the terminal in response to receiving a selfie preview operation triggered by a user;
  obtaining a mirror image of the target object by reading the object image from the image sensor; and
  generating a selfie preview image according to the mirror image, and displaying the selfie preview image on the first display.

In some examples, in the unfolded state, the terminal further includes a second surface opposite to the first surface, and the second surface has a second display; the selfie preview operation includes a first operation and a second operation triggered on the second display; and the acquiring the object image of the target object by using the image acquisition apparatus in response to receiving the selfie preview operation triggered by the user includes:
  displaying an image acquisition picture acquired by using the image acquisition apparatus on the second display in response to receiving the first operation; and
  acquiring the object image of the target object by using the image acquisition apparatus in response to receiving the second operation.

In some examples, the method further includes: turning off the selfie preview image on the second display when the selfie preview image is displayed on the first display.

In some examples, the obtaining the mirror image of the target object by reading the object image from the image sensor includes:
  sequentially reading a plurality of row pixel information of each row pixel point in the object image in a first preset sequence; and
  generating the mirror image in a second preset sequence according to the row pixel information, the first preset sequence is opposite to the second preset sequence.

In some examples, the image acquisition apparatus includes a plurality of image acquisition components, and the acquiring the object image of the target object by using the image acquisition apparatus includes:
  acquiring the object image of the target object by using one or more image acquisition components of the plurality of image acquisition components.

In some examples, generating the selfie preview image according to the mirror image includes:
  using the mirror image as the selfie preview image; or
  obtaining the selfie preview image by performing first image enhancing processing on the mirror image.

In some examples, the first image enhancing processing includes at least one of cultural black and white, portrait helical focus and portrait soft focus.

In some examples, the method further includes:
  generating a target image corresponding to the target object according to the mirror image in response to receiving an image generation operation triggered by the user.

In some examples, generating the target image corresponding to the target object according to the mirror image includes:
  acquiring mirror indication information preset by the user, the mirror indication information is used to indicate whether to turn on mirror processing or turn off mirror processing; and
  generating the target image according to the mirror indication information and the mirror image.

In some examples, generating the target image according to the mirror indication information and the mirror image includes:
  generating the target image according to the mirror image while the mirror indication information is used to indicate to turn on mirror processing; or
  obtaining the target image by performing mirror processing on the mirror image when the mirror indication information is used to indicate to turn off mirror processing.

In some examples, obtaining the target image by performing mirror processing on the mirror image includes:
  sequentially reading a plurality of column pixel information of each column pixel point in the mirror image in a third preset sequence; and
  generating the target image in a fourth preset sequence according to the column pixel information, the third preset sequence is opposite to the fourth preset sequence.

In some examples, generating the target image according to the mirror image includes:
  using the mirror image as the target image; or
  obtaining the target image by performing second image enhancing processing on the mirror image.

In some examples, the second image enhancing processing includes at least one of cultural black and white, portrait helical focus, and portrait soft focus.

According to a second aspect of examples of the present disclosure, an image processing apparatus is provided, in an unfolded state, the terminal includes a first surface, where the first surface includes a first display and an image acquisition apparatus, the image acquisition apparatus includes an image sensor, and the image processing apparatus includes:
  an acquisition module, configured to acquire an object image of a target object by using the image acquisition apparatus in an unfolded state of the terminal in response to receiving a selfie preview operation triggered by a user;
  a generation module, configured to obtain a mirror image of the target object by reading the object image from the image sensor; and
  a preview module, configured to generate a selfie preview image according to the mirror image, and display the selfie preview image on the first display.

In some examples, in the unfolded state of the terminal, the terminal further includes a second surface opposite to the first surface, and the second surface has a second display; the selfie preview operation includes a first operation and a second operation triggered on the second display; the acquisition module is further configured to:

displaying an image acquisition picture acquired by using the image acquisition apparatus on the second display in response to receiving the first operation; and
  acquiring the object image of the target object by using the image acquisition apparatus in response to receiving the second operation.

In some examples, the preview module is further configured to:

turn off the selfie preview image on the second display when displaying the selfie preview image on the first display.

In some examples, the generation module is further configured to:

sequentially reading a plurality of row pixel information of each row pixel point in the object image in a first preset sequence; and
  generating the mirror image in a second preset sequence according to the row pixel information, the first preset sequence is opposite to the second preset sequence.

In some examples, the image acquisition apparatus includes a plurality of image acquisition components, and the acquisition module is further configured to:

acquiring the object image of the target object by using one or more image acquisition components of the plurality of image acquisition components.

In some examples, the preview module is further configured to:

using the mirror image as the selfie preview image; or
  obtaining the selfie preview image by performing first image enhancing processing on the mirror image.

In some examples, the apparatus further includes:

an image generation module, configured to generate the target image corresponding to the target object according to the mirror image in response to receiving an image generation operation triggered by the user.

In some examples, the image generation module is further configured to:

acquiring mirror indication information preset by the user, the mirror indication information is used to indicate to turn on mirror processing or turn off mirror processing; and
  generating the target image according to the mirror indication information and the mirror image.

In some examples, the image generation module is further configured to:

generating the target image according to the mirror image while the mirror indication information is used to indicate to turn on mirror processing; or
  obtaining the target image by performing mirror processing on the mirror image when the mirror indication information is used to indicate to turn off mirror processing.

In some examples, the image generation module is further configured to:

sequentially reading a plurality of column pixel information of each column pixel point in the mirror image in a third preset sequence; and
  generating the target image in a fourth preset sequence according to the column pixel information, the third preset sequence is opposite to the fourth preset sequence.

In some examples, the image generation module is further configured to:

using the mirror image as the target image; or
  obtaining the target image by performing second image enhancing processing on the mirror image.

According to a third aspect of examples of the present disclosure, an electronic device is provided, the electronic device includes:

a memory, on which a computer program is stored; and
  a processor, used to execute the computer program in the memory, so as to implement steps of the method in any one of the examples in the first aspect.

According to a fourth aspect of examples of the present disclosure, there is provided a non-transitory computer-readable storage medium on which a computer program is stored, and steps of the method in the first aspect are implemented when the program is executed by the processor.

The technical solutions provided by the examples of the disclosure may include the following beneficial effects:

In the unfolded state of the terminal, the object image of the target object is acquired by using the image acquisition apparatus in response to receiving the selfie preview operation triggered by the user; subsequently the mirror image of the target object is obtained by reading the object image from the image sensor; and finally, the selfie preview image is generated according to the mirror image, and the selfie preview image is displayed on the first display. In this way, the mirror image of the target object is directly obtained to generate the selfie preview image, without performing mirror processing on the operating system level of a terminal, so that resource consumption of the terminal is reduced, the maintainability of software is improved, power consumption of the terminal is reduced, and the experience of the user is improved.

What is claimed is:

1. An image processing method, performed by a terminal with foldable screen, in an unfolded state, the terminal comprises a first surface, wherein the first surface comprises a first display and an image acquisition apparatus, the image acquisition apparatus comprises an image sensor, and the method comprises:

acquiring mirror indication information, wherein the mirror indication information is preset by a user and used to indicate to enable or disable mirror processing;
  acquiring an object image of a target object by using the image acquisition apparatus in the unfolded state of the terminal in response to receiving a selfie preview operation triggered by the user;
  obtaining a mirror image of the target object by reading the object image from the image sensor;
  generating a selfie preview image according to the mirror image, and displaying the selfie preview image on the first display; and
  generating a target image corresponding to the target object according to the mirror image and the mirror indication information in response to receiving an image generation operation triggered by the user.

2. The method according to claim 1, wherein in the unfolded state of the terminal, the terminal further comprises a second surface opposite to the first surface, and the second surface has a second display; the selfie preview operation comprises a first operation and a second operation triggered on the second display;

acquiring the object image of the target object by using the image acquisition apparatus in response to receiving the selfie preview operation triggered by the user comprises:
displaying an image acquisition picture acquired by using the image acquisition apparatus on the second display in response to receiving the first operation; and
acquiring the object image of the target object by using the image acquisition apparatus in response to receiving the second operation.

3. The method according to claim 2, further comprising:
turning off the selfie preview image on the second display when displaying the selfie preview image on the first display.

4. The method according to claim 1, wherein obtaining the mirror image of the target object by reading the object image from the image sensor comprises:
sequentially reading a plurality of row pixel information of each row pixel point in the object image in a first preset sequence; and
generating the mirror image in a second preset sequence according to the row pixel information, wherein the first preset sequence is opposite to the second preset sequence.

5. The method according to claim 1, wherein the image acquisition apparatus comprises a plurality of image acquisition components, and acquiring the object image of the target object by using the image acquisition apparatus comprises:
acquiring the object image of the target object by using one or more image acquisition components of the plurality of image acquisition components.

6. The method according to claim 1, wherein generating the selfie preview image according to the mirror image comprises:
using the mirror image as the selfie preview image.

7. The method according to claim 1, wherein generating the selfie preview image according to the mirror image comprises:
obtaining the selfie preview image by performing first image enhancing processing on the mirror image.

8. The method according to claim 7, wherein the first image enhancing processing comprises at least one of cultural black and white, portrait helical focus, and portrait soft focus.

9. The method according to claim 1, wherein generating the target image according to the mirror indication information and the mirror image comprises:
generating the target image according to the mirror image while the mirror indication information is used to indicate to turn on the mirror processing; or
obtaining the target image by performing the mirror processing on the mirror image when the mirror indication information is used to indicate to turn off the mirror processing.

10. The method according to claim 9, wherein obtaining the target image by performing the mirror processing on the mirror image comprises:
sequentially reading a plurality of column pixel information of each column pixel point in the mirror image in a third preset sequence; and
generating the target image in a fourth preset sequence according to the column pixel information, wherein the third preset sequence is opposite to the fourth preset sequence.

11. The method according to claim 9, wherein generating the target image according to the mirror image comprises:
using the mirror image as the target image; or
obtaining the target image by performing second image enhancing processing on the mirror image.

12. The method according to claim 11, wherein the second image enhancing processing comprises at least one of cultural black and white, portrait helical focus, and portrait soft focus.

13. A terminal with foldable screen, wherein in an unfolded state, the terminal comprises a first surface, wherein the first surface comprises a first display and an image acquisition apparatus, the image acquisition apparatus comprises an image sensor, and the terminal comprises:
a memory, on which a computer program is stored; and
one or more processors that are communicatively coupled to the memory, wherein the one or more processors are collectively configured to:
acquire mirror indication information, wherein the mirror indication information is preset by a user and used to enable or disable mirror processing;
acquire an object image of a target object by using the image acquisition apparatus in the unfolded state of the terminal in response to receiving a selfie preview operation triggered by the user;
obtain a mirror image of the target object by reading the object image from the image sensor; and
generate a selfie preview image according to the mirror image, and displaying the selfie preview image on the first display;
generate a target image corresponding to the target object according to the mirror image and the mirror indication information in response to receiving an image generation operation triggered by the user.

14. The terminal according to claim 13, wherein at the unfolded state of the terminal, the terminal further comprises a second surface opposite to the first surface, and the second surface has a second display; the selfie preview operation comprises a first operation and a second operation triggered on the second display;
wherein the one or more processors are further collectively configured to:
display an image acquisition picture acquired by using the image acquisition apparatus on the second display in response to receiving the first operation; and
acquire the object image of the target object by using the image acquisition apparatus in response to receiving the second operation.

15. The terminal according to claim 14, wherein the one or more processors are further collectively configured to:
turn off the selfie preview image on the second display when displaying the selfie preview image on the first display.

16. The terminal according to claim 13, wherein the one or more processors are further collectively configured to:
sequentially read a plurality of row pixel information of each row pixel point in the object image in a first preset sequence; and
generate the mirror image in a second preset sequence according to the row pixel information, wherein the first preset sequence is opposite to the second preset sequence.

17. The terminal according to claim 13, wherein the image acquisition apparatus comprises a plurality of image acquisition components, and the one or more processors are further collectively configured to:

acquire the object image of the target object by using one or more image acquisition components of the plurality of image acquisition components.

18. A non-transitory computer-readable storage medium storing computer program instructions, the computer program instructions when executed by one or more processors cause the one or more processors to collectively execute an image processing method comprising:
- acquiring mirror indication information, wherein the mirror indication information is preset by a user and used to enable or disable mirror processing;
- acquiring an object image of a target object by using an image acquisition apparatus in an unfolded state of a terminal with foldable screen in response to receiving a selfie preview operation triggered by the user; wherein in the unfolded state, the terminal comprises a first surface, wherein the first surface comprises a first display and the image acquisition apparatus, the image acquisition apparatus comprises an image sensor,
- obtaining a mirror image of the target object by reading the object image from the image sensor;
- generating a selfie preview image according to the mirror image, and displaying the selfie preview image on the first display; and
- generating a target image corresponding to the target object according to the mirror image and the mirror indication information in response to receiving an image generation operation triggered by the user.

* * * * *

UNITED STATES PATENT AND TRADEMARK OFFICE
CERTIFICATE OF CORRECTION

| | |
|---|---|
| PATENT NO. | : 12,120,419 B2 |
| APPLICATION NO. | : 18/075846 |
| DATED | : October 15, 2024 |
| INVENTOR(S) | : Yue Wang |

It is certified that error appears in the above-identified patent and that said Letters Patent is hereby corrected as shown below:

In the Specification

In Column 2, Line 66, delete ""n"" and insert -- "ɐ" --, therefor.

In Column 7, Line 32, delete "(WE)," and insert -- (IPE), --, therefor.

In the Claims

In Column 16, Line 26, in Claim 13, delete "sensor; and" and insert -- sensor; --, therefor.

In Column 16, Line 29, in Claim 13, delete "display;" and insert -- display; and --, therefor.

In Column 17, Line 19, in Claim 18, delete "sensor," and insert -- sensor; --, therefor.

Signed and Sealed this
Seventeenth Day of December, 2024

Derrick Brent
*Acting Director of the United States Patent and Trademark Office*